(12) United States Patent
Voller et al.

(10) Patent No.: US 11,195,669 B2
(45) Date of Patent: Dec. 7, 2021

(54) ENERGY STORAGE DEVICE

(71) Applicant: Oxcion Limited, Wellington (GB)

(72) Inventors: Stephen David Voller, Harwell (GB);
Hugh Liam Sutherland, Harwell (GB);
Charles Resnick, Harwell (GB);
Anthony Burn, Harwell (GB);
Marappa Gounder Rajendran,
Harwell (GB); **Myrsini Kyriaki
Antoniou**, Harwell (GB)

(73) Assignee: Oxcion Limited, Wellington (GB)

( * ) Notice: Subject to any disclaimer, the term of this patent is extended or adjusted under 35 U.S.C. 154(b) by 0 days.

(21) Appl. No.: 16/606,590

(22) PCT Filed: Apr. 18, 2018

(86) PCT No.: PCT/GB2018/051015
§ 371 (c)(1),
(2) Date: Oct. 18, 2019

(87) PCT Pub. No.: WO2018/193246
PCT Pub. Date: Oct. 25, 2018

(65) Prior Publication Data
US 2020/0135412 A1  Apr. 30, 2020

(30) Foreign Application Priority Data

Apr. 18, 2017 (EP) ...................................... 17386016
Aug. 31, 2017 (GB) ...................................... 1713986

(51) Int. Cl.
*H01G 11/36* (2013.01)
*H01G 11/56* (2013.01)
(Continued)

(52) U.S. Cl.
CPC ............. *H01G 11/36* (2013.01); *H01G 11/56* (2013.01); *H01G 11/58* (2013.01); *H01G 11/82* (2013.01); *H01G 11/08* (2013.01)

(58) Field of Classification Search
None
See application file for complete search history.

(56) References Cited

U.S. PATENT DOCUMENTS 5,862,035 A    1/1999  Farahmandi et al.
10,546,698 B2 *  1/2020  Nguyen .............. H01M 4/0428
(Continued)

FOREIGN PATENT DOCUMENTS

EP    3190641 A1    7/2017
GB    2548128 A     9/2017
(Continued)

OTHER PUBLICATIONS

Gao, W.J., et al., Development and characterization of Li-ion capacitor pouch cells, Journal of Power Sources, Jan. 24, 2014, vol. 257, pp. 388-393.
(Continued)

*Primary Examiner* — Dion Ferguson
(74) *Attorney, Agent, or Firm* — Hodgson Russ LLP (57) ABSTRACT

An energy-storage device is provided. It includes a charge-storing supercapacitor cell comprised of electrodes at least one of which includes a nano-carbon component, a ion-permeable membrane and an electrolyte characterised in that the cell is embedded or encapsulated in a flexible or rigid matrix.

13 Claims, 7 Drawing Sheets

(51) Int. Cl.
  *H01G 11/58* (2013.01)
  *H01G 11/82* (2013.01)
  *H01G 11/08* (2013.01)

(56) References Cited

U.S. PATENT DOCUMENTS

| | | | |
|---|---|---|---|
| 10,734,166 B2* | 8/2020 | Nguyen | C23C 8/80 |
| 2003/0127561 A1* | 7/2003 | Somers | B64C 3/14 |
| | | | 244/35 R |
| 2003/0169558 A1* | 9/2003 | Olson | H01G 11/40 |
| | | | 361/502 |
| 2010/0035093 A1* | 2/2010 | Ruoff | H01M 4/926 |
| | | | 429/493 |
| 2011/0164349 A1* | 7/2011 | Snyder | H01G 11/84 |
| | | | 361/525 |
| 2011/0253436 A1* | 10/2011 | Hasegawa | H01G 11/82 |
| | | | 174/259 |
| 2012/0025787 A1 | 2/2012 | Rouvala et al. | |
| 2012/0154979 A1 | 6/2012 | Signorelli et al. | |
| 2013/0224551 A1 | 8/2013 | Hiralal et al. | |
| 2013/0266856 A1* | 10/2013 | Ryhanen | H01M 10/058 |
| | | | 429/211 |
| 2014/0014403 A1 | 1/2014 | Miller et al. | |
| 2015/0062780 A1 | 3/2015 | Gadkaree et al. | |
| 2015/0093629 A1* | 4/2015 | Sayre | H01M 10/0413 |
| | | | 429/156 |
| 2015/0162140 A1* | 6/2015 | Hucker | H01G 13/04 |
| | | | 361/502 |
| 2016/0006043 A1* | 1/2016 | Hucker | H01M 4/244 |
| | | | 429/52 |
| 2016/0141900 A1 | 5/2016 | Voller et al. | |
| 2017/0050533 A1* | 2/2017 | Wei | B60L 50/40 |
| 2017/0200570 A1* | 7/2017 | Ciocanel | H01G 11/26 |
| 2018/0062159 A1* | 3/2018 | El-Kady | H01M 10/052 |
| 2018/0211794 A1* | 7/2018 | Brambilla | H01G 11/64 |
| 2018/0218846 A1* | 8/2018 | Mancevski | H01G 11/32 |
| 2019/0272961 A1* | 9/2019 | Voller | H01G 11/14 |
| 2019/0365060 A1* | 12/2019 | Sutherland | G06F 1/16 |

FOREIGN PATENT DOCUMENTS

| | | |
|---|---|---|
| JP | 2003124077 A | 4/2003 |
| TW | 201240196 A | 10/2012 |
| WO | 2014/021970 A2 | 2/2014 |

OTHER PUBLICATIONS

Yan, H., et al., Functional flexible and wearable supercapcitors, Journal of Physics D: Applied Physics, 2017, vol. 50, No. 27, p. 273001 (19 pages).

* cited by examiner

ENERGY STORAGE DEVICE

This invention relates to an energy-storage device including a charge-storing supercapacitor cell which is designed to be rigid or flexible enough to be used as a component in vehicle or aircraft panels, consumer appliances, wearable items and the like.

In our previous patent application WO2016075431 we have taught inter alia new charge-carrying cells exhibiting electrostatic double-layer supercapacitance behaviour which are characterised by including electrodes (anodes and cathodes) which include nano-carbon particles as the conducting components. Typically, these nano-carbon particles are comprised of one or more of the following components graphene, carbon nanotubes and fullerenes. Such cells which we now market under the names Carbon-Ion™ or C-Ion* have been proven to exhibit excellent charge-holding and charge-discharge behaviour at low equivalent series resistance and over multiple cycles making them suitable for a range of applications where a portable power source is required.

The use of graphene in the construction of capacitors has also previously been disclosed in WO2013180661, CN104229780, US2012170171, KR20140094346, CN104064364, US2014127584, US2012045688 and U.S. Pat. No. 8,503,161. Furthermore, US20140321027 and Nano Letters 2009 9(5) pp. 1872-1876 disclose the use of carbon nanotubes in supercapacitor or ultracapacitor cells.

During our development activities we have identified a need to develop cells which have a high degree of mechanical integrity, for example structural rigidity or flexibility, in order for them to be deployed as a lightweight component in a range of applications. This is especially beneficial in transportation applications where success depends on finding the right balance between the weight of the supercapacitor unit; the power it delivers and its ability to be incorporated into existing designs for aesthetic, safety or technical reasons. Such issues have received relatively little attention in the art but now that the lifetime of such cells is becoming longer and more commercially attractive this is something which needs to be addressed.

US20130224551 discloses a supercapacitor wherein the electrodes comprise a substrate which is stretchable. Yan et al discuss functional flexible and wearable supercapacitors in Journal of Physics D: Applied Physics 2017 50(27) p. 273001. Neither of these however are principally concerned with applications where a degree of structural integrity is required. Other references specifying characteristics of supercapacitors include U.S. Pat. No. 5,862,035, US20120154979, US20150062780 and JP 2003124077.

According to the present invention there is provided an energy-storage device including a charge-storing supercapacitor cell comprised of electrodes at least one of which includes a nano-carbon component, a ion-permeable membrane and an electrolyte characterised in that the cell is embedded or encapsulated in a flexible or rigid matrix.

Figure 1:
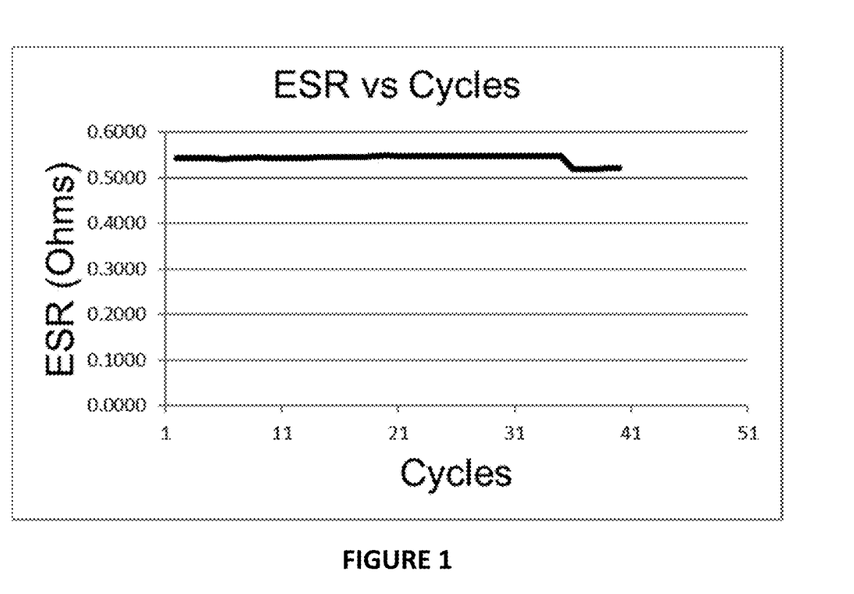
FIG. 1 is a graph of equivalent series resistance (ESR) against number of cycles for a flat carbon fibre panel according to the present disclosure.
Figure 2:
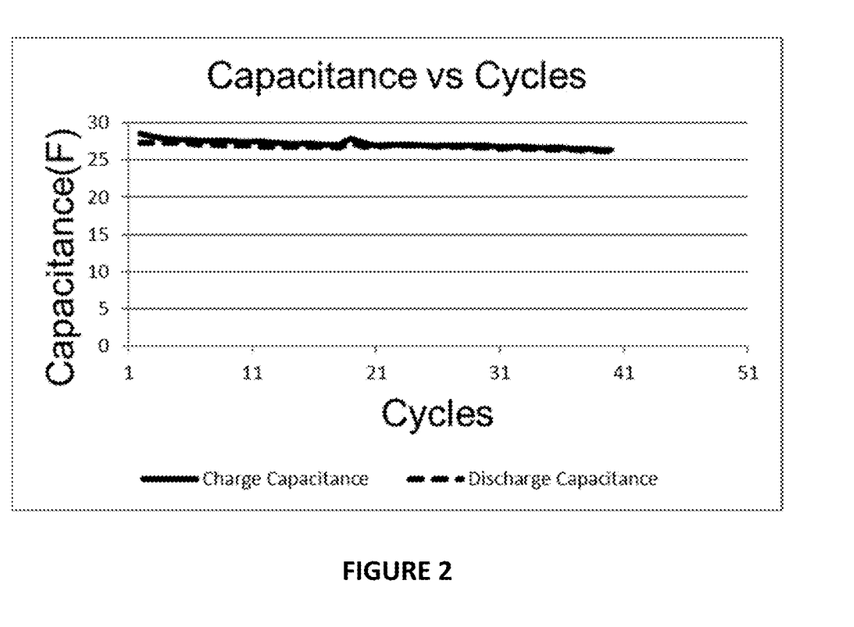
FIG. 2 is a graph of capacitance against number of cycles for a flat carbon fibre panel according to the present disclosure.
Figure 3:
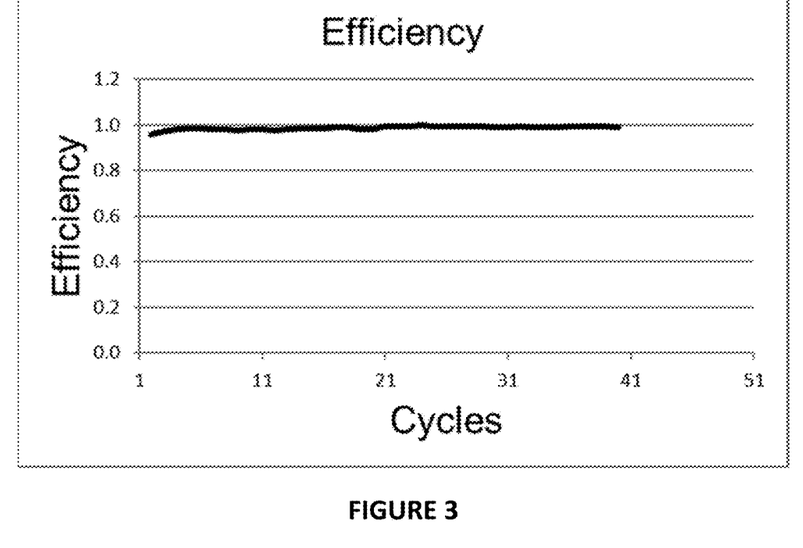
FIG. 3 is a graph of efficiency against number of cycles for a flat carbon fibre panel according to the present disclosure.
Figure 4:
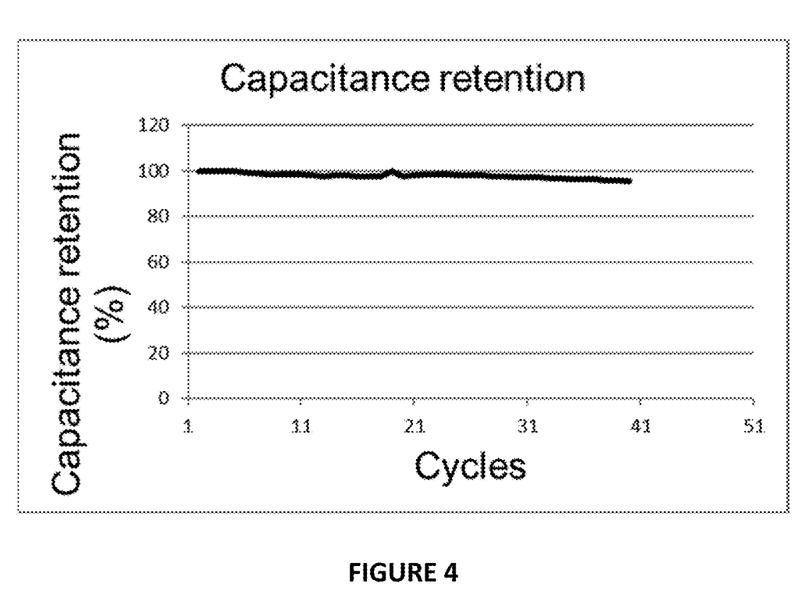
FIG. 4 is a graph of capacitance retention against number of cycles for a flat carbon fibre panel according to the present disclosure.
Figure 5:
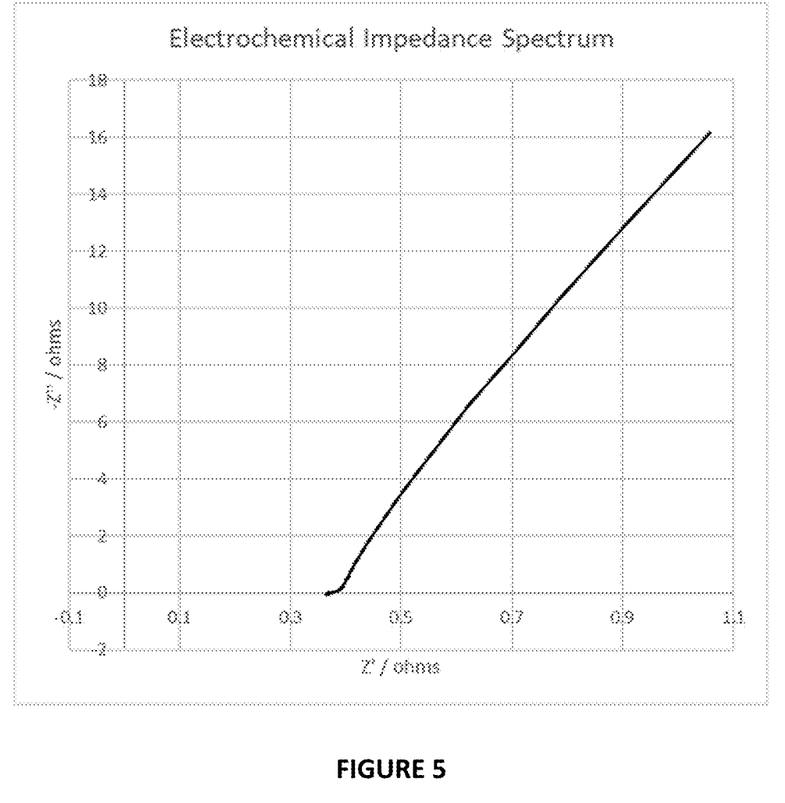
FIG. 5 is an electrochemical impedance spectrum for a flat carbon fibre panel according to the present disclosure.
Figure 6:
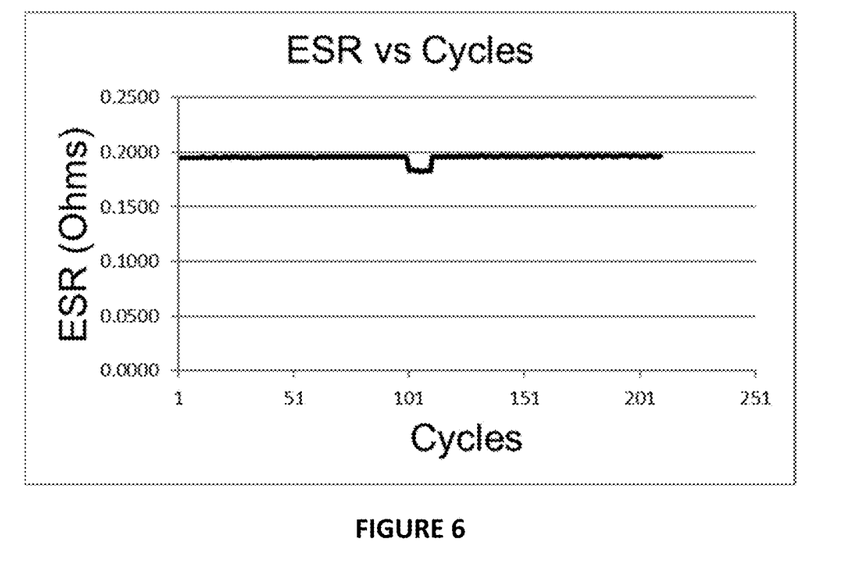
FIG. 6 is a graph of equivalent series resistance (ESR) against number of cycles for a curvilinear carbon fibre panel according to the present disclosure.
Figure 7:
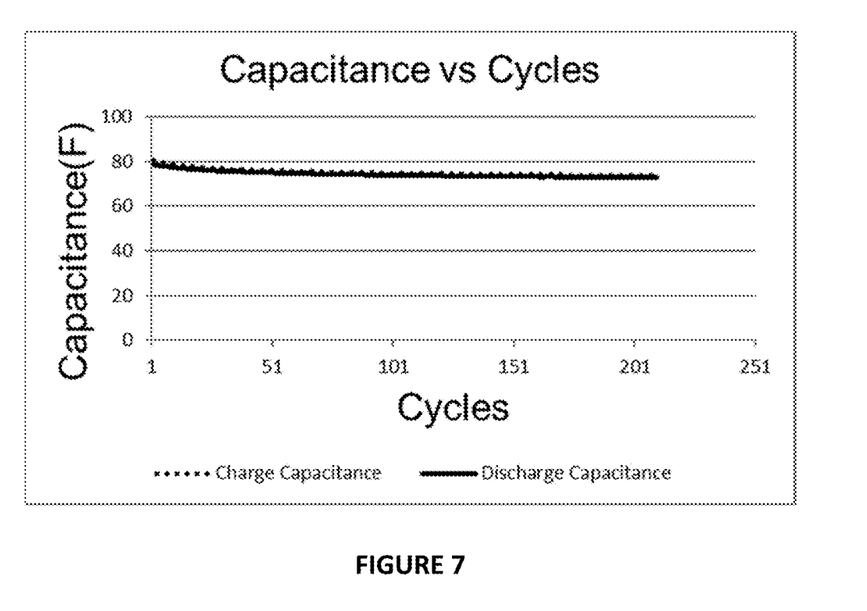
FIG. 7 is a graph of capacitance against number of cycles for a curvilinear carbon fibre panel according to the present disclosure.
Figure 8:
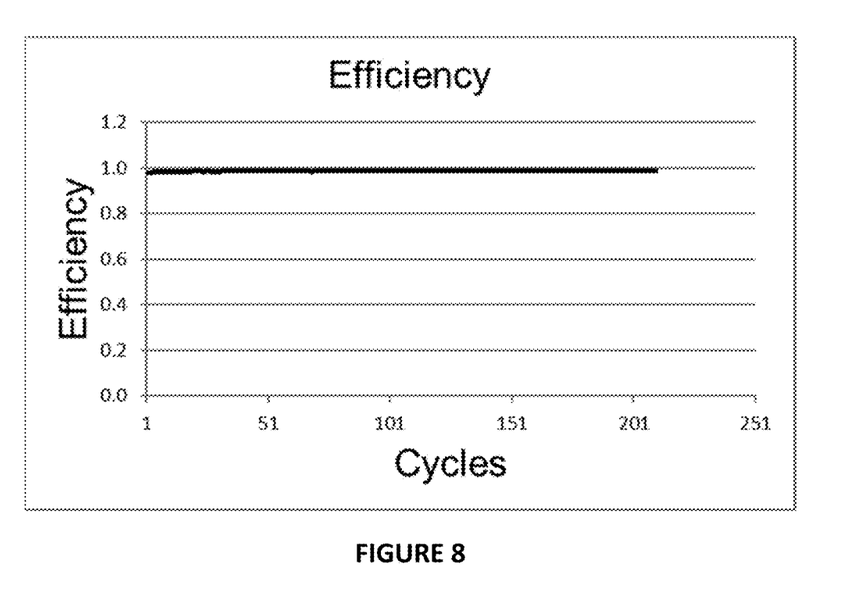
FIG. 8 is a graph of efficiency against number of cycles for a curvilinear carbon fibre panel according to the present disclosure.
Figure 9:
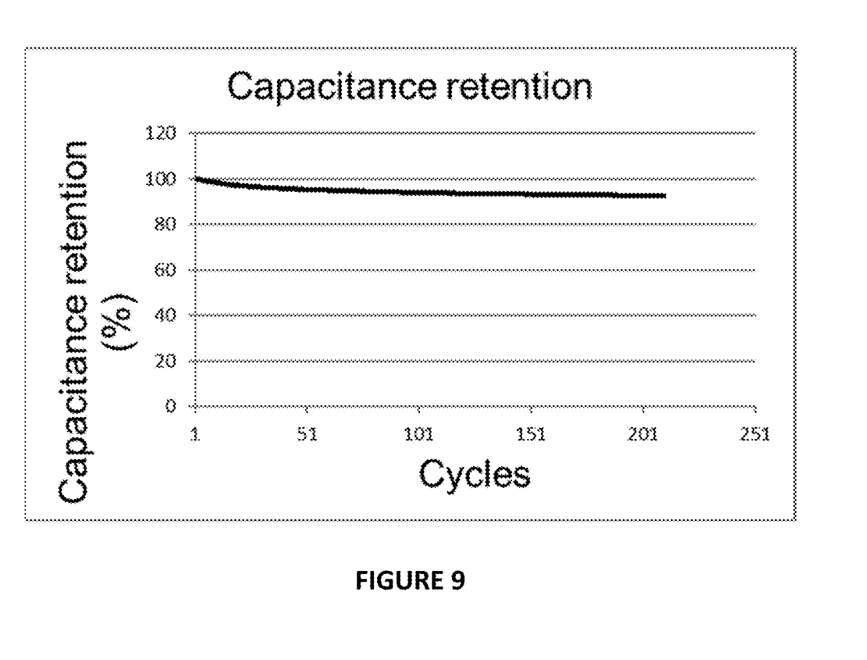
FIG. 9 is a graph of capacitance retention against number of cycles for a curvilinear carbon fibre panel according to the present disclosure.
Figure 10:
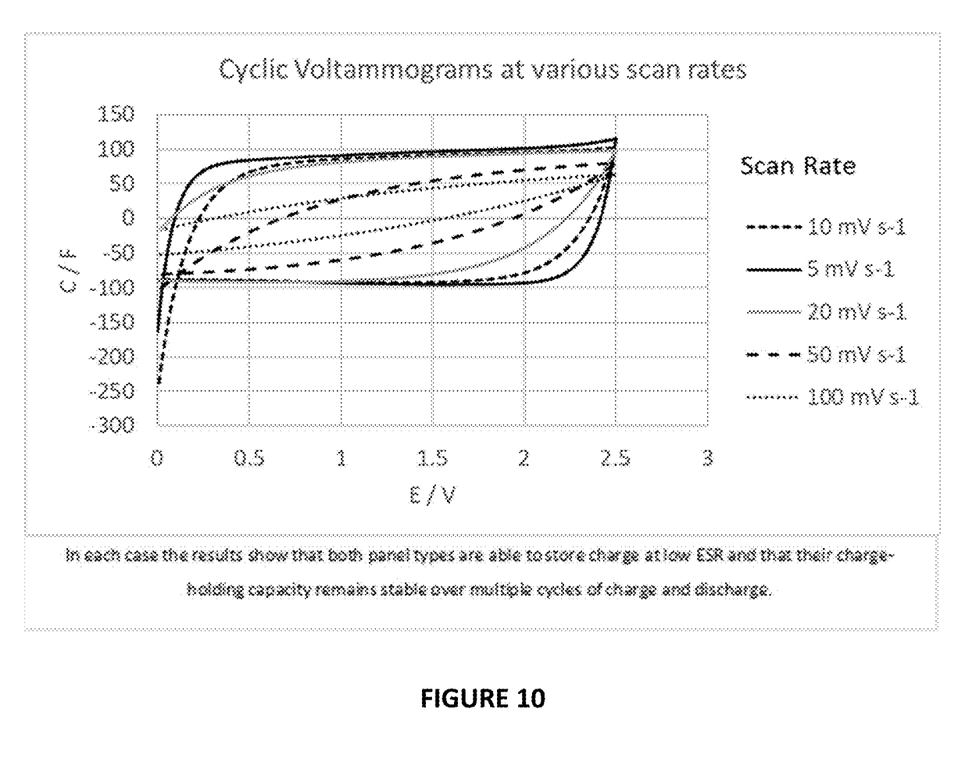
FIG. 10 shows cyclic voltammograms at various scan rates for a curvilinear carbon fibre panel according to the present disclosure.
Figure 11:
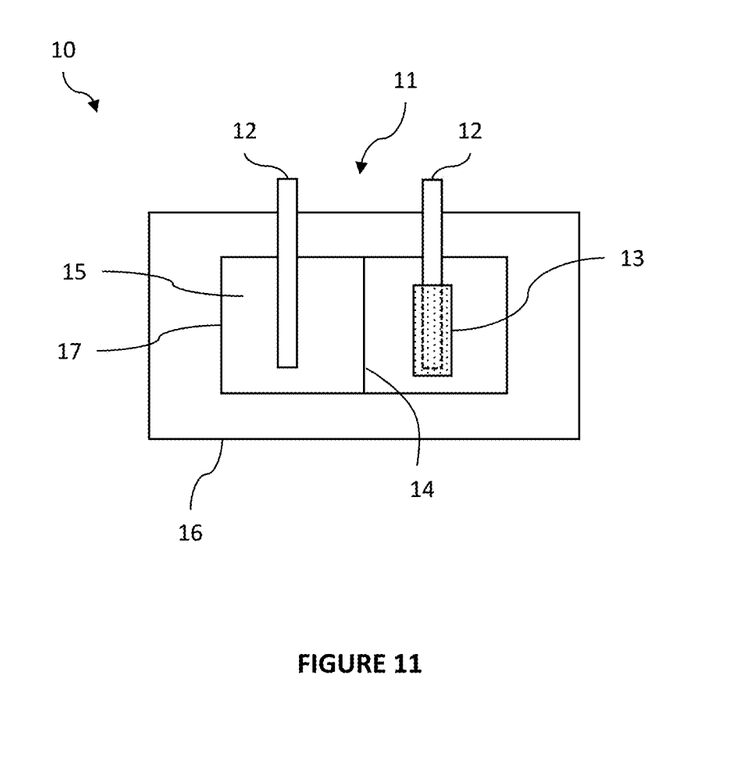
FIG. 11 shows an energy storage device (10) according to the present disclosure, including a charge-storing supercapacitor cell (11) comprised of electrodes (12), as least one of which includes activated carbon having a high surface area and a nano-carbon component (13) comprising carbon nanotubes, graphene or a mixture thereof embedded in an electrically conductive polymer binder matrix, an ion permeable membrane (14) and an electrolyte (15) characterized in that the cell (11) is embedded or encapsulated in a flexible or rigid matrix (16); and the matrix (16) defines at least one void (17) for containing the electrolyte (15).
Figure 12:
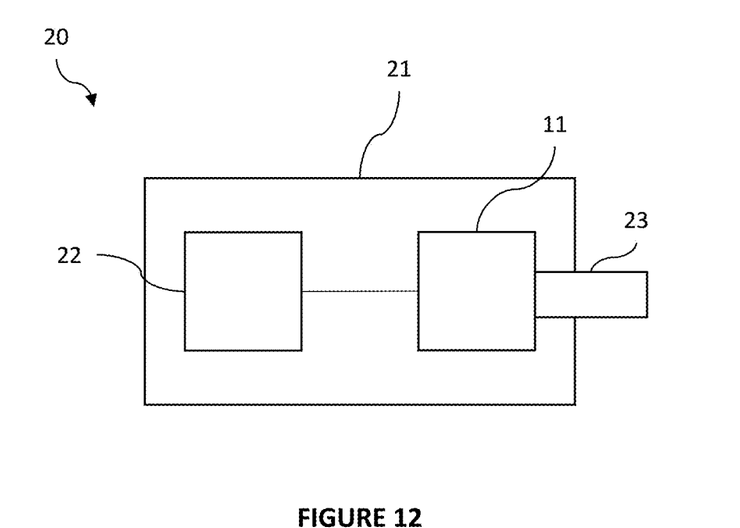
FIG. 12 shows a body part for a transportation vehicle (20) according to the present disclosure, comprising an aerodynamically-shaped flexible or rigid element (21) which encapsulates or in which is embedded at least one charge-storing supercapacitor cell (11); a photovoltaic cell (22) which is attached to or disposed within at least one surface of the element (21) and which is in electrical contact with the charge-storing supercapacitor cell (11); and a connector (23) for electrically connecting the body part (20) to another body part or an electrical component of the transportation vehicle.

In one embodiment, the flexible or rigid matrix is adapted to provide sufficient structural integrity to the energy storage device or to an object into which the energy storage device is incorporated to meet the demands of use or meet safety standards.

The present invention solves this problem by providing a range of technical approaches which can employed to develop robust components for all of the applications mentioned above. It is a feature of the invention that the charge-storing cell is incorporated into or made part of a matrix exhibiting the required engineering or structural characteristics. In a first embodiment, the charge-storing cell(s) are manufactured as sealed pouches which may be encapsulated within a flexible matrix. Suitably, the pouch is made of a flexible polymer film (e.g. low-density polyethylene or polypropylene film) and contains the critical operating components of the cell. The electrodes or the electrode contacts attached thereto then protrude from the pouch and optionally through the surrounding matrix if the latter is not conducting.

In a second embodiment, the charge-storing cell is an integral part of a non-conducting matrix, for example an engineering polymer. Suitably this is achieved by creating one or more voids in the matrix which are filled with the electrolyte and divided into compartments by means of one or more ion-permeable membranes. Electrodes protrude from the matrix into the various compartments so that when the void is filled with electrolyte the cell is created. In one example, the electrodes comprise sheets of aluminium foil to which has been attached a coating comprised of nano-carbon components and charge-storing carbon component(s) such as an activated carbon having a high surface-area. Here, the electrolyte may be a liquid, gel or polymer and each void may contain two or more sub-cells made from multiple anodes, cathodes and membranes. As before, the electrodes or associated electrical contacts protrude from the matrix.

In a third embodiment, the energy-storage device is of composite form and made by embedding the electrodes and the ion-permeable membrane into a flexible matrix comprised of a gel or solid polyelectrolyte and optionally other polymers or fibres exhibiting dielectric behaviour to provide the desired mechanical properties. The composite may then be coated for decoration or to add a barrier layer excluding moisture and/or oxygen. As before, the electrodes or associated electrical contacts protrude from the matrix.

In a fourth embodiment, the energy storage device is of composite form and made using electrodes which are in the form of a textile, for example a woven, non-woven or electrospun cloth or mat, and by then coating the electrodes in a flexible matrix comprised of a gel or solid polyelectrolyte. The electrodes are brought together so as to form ionic but not electrical contact, for example by cold or hot pressing together or onto either side of a polyelectrolyte membrane or polyelectrolyte soaked separator. The resulting composite retains many of the physical properties of the textile and can be used as such. The composite may then be coated for decoration or to add a barrier layer excluding moisture and/or oxygen. As before, the electrodes or associated electrical contacts protrude from the matrix.

In a fifth embodiment, the charge-storing cells are manufactured as pouches or of a like formable format, and encapsulated within a rigid matrix. As before, the electrodes or associated electrical contacts protrude from the matrix.

In a sixth embodiment, the electrodes are self-supporting carbon structures or coated aluminium foil sheets embedded within a rigid structural matrix. In one version of this embodiment, the electrodes are associated with voids which contain the ion-permeable membrane(s) and a liquid, gel or polymer electrolyte. The rigid structure may comprise a polymer composite and may contain other reinforcements in the form of inserts. Multiple sub-cells in each void are contemplated and the electrodes or associated electrical contacts protrude from the matrix.

In a seventh embodiment a composite material is made by embedding the electrodes in a hard polymer matrix to form a rigid composite structure. This matrix may be a gel or solid polyelectrolyte but must be sufficiently strong to form the structure of the device. The rigid structure may contain other reinforcements see above. As before, the electrodes or associated electrical contacts protrude from the matrix.

In some embodiments, where the matrix is carbon-containing (e.g. carbon fibre), it has been found that by exposing the surface carbon fibres the matrix may act as an efficient collector of current from the electrodes thereby obviating the need for an aluminium foil collector the like.

Turning to the charge-storing cell components, in one embodiment the electrodes comprise anode and cathode surfaces consisting essentially of an electrically-conductive metal current collector in the form of a thin flexible sheet (for example aluminium, silver or copper foil) coated with a layer which includes the nano-carbon components. In some instances, at least some of these anode and cathode layers are disposed on opposite sides of the same sheet. Suitably, at least some of the nano-carbon component are particles having an average finite longest dimension of less than 20 microns. Preferably, these particles exhibit mesoporosity with the mesopores being in the size range 2 to 50 nanometres. In another embodiment, the nano-carbon component may be supplemented by nanoparticles of materials which can confer a degree of pseudocapacitance behaviour on the final charge-storing cell; for example, salts, hydroxides and oxides of metals such as lithium or transition metals with more than one oxidation state including nickel, manganese, ruthenium, bismuth, tungsten or molybdenum.

In one preferred version of this embodiment, the electrode layer is itself a composite comprised of nano-carbon particles embedded in a conductive polymer binder matrix and is characterised by the weight ratio of the particles to the binder being in the range 0.2:1 to 20:1. In another version, the nano-carbon component includes graphene particles or it includes carbon nanotubes. In one preferred embodiment, carbon nanotubes optionally supplemented by graphene particles and a high surface area activated carbon are the principal electrical components of the electrode. In another suitable embodiment, the carbon particles comprise a mixture of the activated carbon, carbon nanotubes and optionally graphene; the components being present in the weight ratio 0.5-2000:0.5-100:0-1; preferably 0.5-1500:0.5-80:0-1.

By the term activated carbon is meant any amorphous carbon of high purity whose surface area is typically greater than 500 $m^2g^{-1}$ preferably from 1000 to 3600 $m^2g^{-1}$ and which has an average particle size of less than 1 micron. Such materials are readily available from a number of commercial sources. In one embodiment one or both of the electrodes may be rendered asymmetric with respect to the other by including a pseudocapacitive component such as a metal oxide, a semiconductor conducting polymer.

The carbon nanotubes used typically have an average longest dimension (length) in the range 2-500 microns (preferably 100-300 microns) and an average diameter in the range 100-150 nanometres. The carbon nanotubes may be single- or multi-walled or a mixture of both.

By the term graphene is meant the allotrope of carbon whose particles are substantially two-dimensional in structure. In extremis, these particles comprise single atomic-layer platelets having a graphitic structure although for the purposes of this invention this component may comprise a small number of such platelets stacked one on top of another e.g. 1 to 20 preferably 1 to 10 platelets. In one embodiment, these platelets are in a non-oxidised form. In another, the platelets independently have average dimensions in the range 1 to 4000 nanometres preferably 20 to 3000 or 10 to 2000 nanometres as measured by transmission electron microscopy. Any known method can be used to manufacture such materials which are also available commercially; for example, under the name Elicarb® by Thomas Swann Limited in the United Kingdom.

In another version, the electrode layer may further include up to 30%, preferably 1 to 20% by weight of a conducting carbon. Suitably, this conducting carbon comprises a highly conductive non-graphitic carbon having a polycrystalline structure and a surface area in the range 1 to 500 $m^2g^{-1}$. In one embodiment, it is a carbon black; for example, one of those material which have been used as conducting additive in lithium-ion batteries (for example Timcal SuperC65® and/or Timcal SuperC45).

Turning to the conductive binder, this is suitably comprised of one or more electrically conductive polymers and is preferably selected from a cellulose derivative, a polymeric elastomer or mixtures thereof. In one embodiment, the cellulose derivative is a carboxyalkyl cellulose for example carboxymethyl cellulose. In another embodiment, the elastomer is a styrene-butadiene rubber or a material having equivalent properties.

Suitably the total charge-bearing surface area of the various components in the composite layer is >250 $m^2g^{-1}$ preferably >260 $m^2g^{-1}$.

In a second embodiment rather than that electrode comprising an coating attached to a foil current collector the electrode is self-supporting and made of some or all the various components specified as above in terms of their nature and formulation characteristics. This design has the advantage that the foil component can be eliminated leading to a possible weight saving.

In both embodiments, the residual moisture in the electrodes should be less than 100 ppm; preferably less than 50 ppm.

The anode and cathode electrodes used in the charge-storing cell may be asymmetric to one another; for example by being of different thicknesses.

Turning to the electrolyte, this suitably includes an ionic liquid i.e. an organic ionic salt which is molten below 100° C. and is preferably so at or below ambient temperatures. In one embodiment, it is a mixture comprised of one or more ionic liquids and the mixture has a viscosity at 25° C. in the range 10 to 80 centipoise; preferably 20 to 50 centipoise. In yet another embodiment, the electrolyte is a eutectic or near-eutectic mixture of at least two components one of which is an ionic liquid. Suitably these mixtures have a melting point below 100° C. preferably below 50° C.; and more preferably below 30° C. Eutectic behaviour is a well-known characteristic of those mixtures of two or more components whose melting point is significantly depressed over a given composition range relative to what might be expected on the basis of Raoult's law. Here, the term 'eutectic or near-eutectic mixture' is therefore to be construed as encompassing any mixture of components according to the invention whose melting point shows such a depression; with those having a depression greater than 50%, preferably greater than 90% of the depression at the actual eutectic point being most preferred. In an especially preferred embodiment the eutectic composition itself is employed as the electrolyte. In another embodiment, at least one of the ionic liquids employed has an electrochemical window greater than 3v.

In one embodiment, the electrolyte employed is a mixture, e.g. a eutectic or near-eutectic mixture, comprised of at least one of the ionic liquids described in U.S. Pat. No. 5,827,602 or WO2011/100232, to which the reader is directed for a complete listing. In another embodiment mixture consists of a mixture of at least two of the said ionic liquids.

Suitably, the ionic liquid employed or one of the ionic liquids employed in the electrolyte is thus a quaternary salt of an alkyl or substituted-alkyl pyridinium, pyridazinium, pyrimidinium, pyrazinium, imidazolium, piperidinium, pyrrolidinium, pyrazolium, thiazolium, oxazolium, triazolium or azepanium cation. In such a case, it is preferred that the counter-anion associated with each cation is large, polyatomic and has a Van der Waals volume in excess of 50 or 100 angstroms (see for example U.S. Pat. No. 5,827,602 which provides illustrative examples contemplated as being within the scope of our invention). It is also preferred that the anion is chosen so that it is asymmetric with respect to the cation ensuring that the ions in the liquid do not easily close pack and cause crystallisation. In one embodiment, the counter-anion is selected from the group consisting of tetrafluoroborate, hexafluorophosphate, dicyanamide, bis(fluorosulphonyl)imide (FSI), bis(trifluoromethylsulphonyl)imide (TFSI) or bis(perfluoro$C_2$to$C_4$alkylsulphonyl)imide e.g. bis(perfluoroethylsulphonyl)imide anions or analogues thereof. In another preferred embodiment, the ionic liquid(s) are selected from $C_1$ to $C_4$ alkyl substituted imidazolium, piperidinium or pyrrolidinium salts of these anions with any permutation of cations and anions being envisaged as being disclosed herein. From amongst this list the following binary systems are preferred: a piperidinium salt and an imidazolium salt; a piperidinium salt and a pyrrolidinium salt and an imidazolium salt and a pyrrolidinium salt. In alternative embodiments, the binary system may comprise either (a) a piperidinium salt and any substituted bulky quaternary ammonium salt of one of the above-mentioned anions; e.g. a tralkyl(alkoxylalkyl)ammonium salt thereof where the alkyl or alkoxy moieties independently have one, two, three or four carbon atoms or (b) one or more of the azepanium salts exemplified WO2011/100232. In all of the cases referred to above, the salts employed should preferably each have an electrochemical window of greater than 3 volts and a melting point below 30° C.

Specific, non-limiting examples of electrolytes which can be employed include salts or mixtures of salts derived from the following cations; 1-ethyl-3-methylimidazolium (EMIM), 1-butyl-3-methylimidazolium (BMIM), 1-methyl-1-propylpyrrolidinium, 1-methyl-1-butylpyrrolidinium and the anions mentioned above. In one embodiment the electrolyte is one or more tetrafluoroborate salts of these cations. In another it is the same salt used in step (a) of the method.

In another embodiment, the ionic liquid is a salt of a quaternary ammonium cation such as N,N-diethyl-N-methyl-N-(2-methoxyethyl)ammonium (DEME) and its homologues.

Suitably the water content of the ionic liquid is less than 100 ppm, preferably less than 50 ppm.

The ion-permeable membrane is suitably made of a polymer or carbon fibre cloth and can be any of those membranes readily available on the market.

As regards the polymer matrix, it can be one of a variety of polymers having the necessary physical and chemical properties required to perform its necessary structural duty. Examples include, polyester, vinyl ester, epoxy resins, phenolic resins, polyimides, polyamides polypropylene and pol(arylene ether). If the matrix is to be conductive, a conductive polymer can be used either alone or in a mixture with other polymers. Examples include polypyrroles, polyanilines, poly(3,4-ethylenedioxythiophene). The matrix can be reinforced with materials such as carbon fibre, glass fibre and aramid fibre. Metal powders, foils, rods and meshes may also be included depending on the design of the device. In one embodiment, these reinforcements are made of a conducting metal e.g. aluminium, copper, silver and the like enabling them to form part of devices associated electrical circuitry.

The charge-storing supercapacitor cell employed in the energy storage unit will suitably have an equivalent series resistance (ESR) of less than 30 Ohms measured over 100 cycles of charge and discharge; a specific conductance of greater than 100 Farads per gram and an energy storage capacity of greater than 6 Wh/kg at an operating voltage of 3.5 Volts.

The energy-storage device may have other components embedded in the matrix for example temperature sensors read-out gauges, control chips and the like.

The energy-storing device of the present can be applied as a component or housing to any item which requires a portable source of electrical power; for example a household item or industrial robot. In another, preferred embodiment of the invention, there is provided body part for a transportation vehicle characterised by consisting of an aerodynamically-shaped flexible or rigid element which encapsulates or in which is embedded at least one charge-storing supercapacitor cell comprised of electrodes at least one of which includes a nano-carbon component, an ion permeable membrane and an electrolyte. In one embodiment, these body parts may fabricated as a composite of sheets and voids. In another, they may further comprise at least one photovoltaic cell which is attached to or embedded in at least one outer surface of the element and which is in electrical contact with the charge-storing supercapacitor cell. Suitably, the photovoltaic cell(s) are silicon panels, an array of silicon solar cells embedded in a flexible matrix flexible or rigid or flexible organic photovoltaic cells. In yet another, the outer surfaces of the body part may be coated within an electrical insulator or lacquered to achieve the same effect.

In another embodiment, the body part may further comprises one or more connectors for electrically connecting it to another complementary body part or an electrical component of the transportation vehicle. The connector can, for example, comprise cooperating plug connector parts disposed around an edge or periphery of adjacent other body parts. In one embodiment, these other body parts may also include a charge-storing supercapacitor cell and/or other electrical components (e.g. a lithium-ion battery, a display means, switches etc) or it may simply carry electrical cabling or other circuitry.

To achieve the aerodynamic properties required the body part or one or more components thereof may be shaped in a former using a combination of heat and pressure to achieve a complex curvilinear morphology calculated in accordance with known mathematical algorithms or theories. Suitably the body parts have a drag coefficient of less than 0.75 preferably less than 0.5; for example in the range 0.75-0.2, preferably in the range 0.5-0.2.

Body parts of the type described above are useful components of transportation vehicles such as automobiles, trucks, buses, aircrafts, helicopters, UPVs, trains, other mass-transit vehicles and the like.

The manufacture and testing of an energy storage device according to the invention is now described with reference to the following protocol and test results.

Production of a Carbon Fibre Panel with Embedded Supercapacitor Cell

A pair of 200 mm×200 m square carbon fibre matrix panels were taken and on one side of each a 180 mm×180 mm central region bounded by an untreated symmetric border was abraded to expose conductive carbon fibre elements. Holes were then drilled from the outside of each panel into the central region and brass rivets inserted to form terminals for the cell. The abraded area around each rivet was then painted with silver-containing ink. Thereafter the border was masked up and a nano-carbon-containing electrode ink applied to the unmasked, abraded areas to generate the electrode layer. In some embodiments the abraded areas were first electroplated with nickel. The final coated panels were then dried in an oven and subsequently demasked.

The demasked panels were next sealed together by gluing around their unabraded borders (optionally incorporating spacers and leaving an unsealed electrolyte inlet) so that the electrode surfaces were juxtaposed facing each other either side of a glass fibre cloth or like permeable membrane which had been inserted between the panels beforehand. By this means, empty supercapacitor pouch cells of approximately 30 ml capacity were produced. After further curing, the empty cells were tested for possible electrical shorting and those passing the test filled with aliquots of the ionic liquid EMIM TFSI. The filled cells were then conditioned to reduce outgassing by applying 3.2V, at 1A across the electrodes. Finally the inlets was sealed and the cells were ready for testing.

To prepare the nanocarbon-containing ink used in the above-mentioned protocol, 154 g of deionised water was placed in a Silverson high shear mixer and stirred at slow speed. 1.8 g of carboxymethyl cellulose (Cellogen WS-C) was then added slowly to avoid agglomeration formation. When addition was complete, the mixture was stirred vigorously for two hours. At the end of this time, the solution was filtered through a 100 micron mesh filter to remove any particulates.

The filtered solution was then placed back in the mixer and 1.8 g of Super C65 conductive carbon black added with stirring for a further two hours. This was followed sequentially by 22.5 g of YP50 activated carbon (ex. Kuraray), 0.015 g Elicarb® graphene (ex. Thomas Swann Limited) and 1.2 g of Elicarb® multi-walled carbon nanotubes (ex. Thomas Swann Limited); again under conditions of moderate stirring for a further two hours. Finally, 3.6 g of a 50% aqueous solution a styrene-butadiene binder (Timical SBR™) was added and the product stirred for a further two hours.

The viscosity of the final ink was measured using a Brookfield DV-II viscometer and was found to be c. 16,400 CP at 24.5° C. Its final solids content, measured by drying 500 mg sample, was 13%. The composition by weight of the solids in the ink was carboxymethyl cellulose 6.2%; SBR binder 6.2%; conductive carbon 6.2% and activated carbon+ graphene+carbon nanotubes 81.4%.

Although in these tests the ionic liquid electrolyte employed was EMIM TFSI, alternative electrolytes such as EMIM tetrafluoroborate, BMIM TFSI and BMIM tetrafluoroborate can be employed Panel Testing Various properties of carbon fibre panels (flat and curvilinear) made in accordance with the above-mentioned protocol were measured over multiple charging and discharging cycles and the results are shown in the figures. In the case of the curvilinear panel, the morphology adopted was that of a sector of a conic section have major and minor diameters of respectively 600 mm and 300 mm. However more complex shapes generated by the application of mathematical algorithms are possible if an appropriately shaped former is fabricated and used.

The invention claimed is:

1. An energy-storage device including a charge-storing supercapacitor cell comprised of electrodes, at least one of which includes activated carbon having a high surface area and a nano-carbon component comprising carbon nanotubes, graphene or a mixture thereof embedded in an electrically conductive polymer binder matrix, an ion permeable membrane and an electrolyte characterised in that the cell is embedded or encapsulated in a flexible or rigid matrix.

2. An energy-storage device as claimed in claim 1 characterised in that the charge-storing cell comprises a polymer pouch in which the electrode(s) and the electrolyte are contained.

3. An energy-storage device as claimed in claim 1 characterised in that matrix defines at least one void for containing the electrolyte.

4. An energy-storage device as claimed in claim 1 characterised in that matrix is a composite structure including the electrolyte in gel or polyelectrolyte form, the electrodes and a polymer component providing structural rigidity or flexibility.

5. An energy-storage device as claimed in claim 1 characterised in that the matrix is coated with a water- and/or oxygen-impermeable barrier layer.

6. An energy-storage device as claimed claim 1 characterised in that the matrix is reinforced by including rigid or flexible metal or polymer inserts or by employing self-supporting electrodes and/or polymer membranes.

7. An energy-storage device as claimed in claim 1 characterised in that the electrode is a woven, non-woven or electrospun cloth or mat and the matrix is comprised of a polymeric electrolyte.

8. An energy storage device as claimed in claim 1 characterised in that the rigid or flexible matrix is a carbon fibre matrix and exposed carbon fibres on a surface thereof act as a current collector for the electrodes.

9. An energy storage device as claimed in claim 1 characterised in that the charge-storing supercapacitor cell has an equivalent series resistance of less than 30 Ohms measured over 100 cycles of charge and discharge; and a specific conductance of greater than 100 Farads per gram and an energy storage capacity of greater than 6 Wh/kg at an operating voltage of 3.5 Volts.

10. A body part for a transportation vehicle characterised by comprising an aerodynamically-shaped flexible or rigid element which encapsulates or in which is embedded at least one charge-storing supercapacitor cell defined in claim 1.

11. A body part as claimed in claim 10 characterised by further comprising a photovoltaic cell which is attached to or disposed within at least one surface of the element and which is in electrical contact with the charge-storing supercapacitor cell.

12. A body part as claimed in claim 10 characterised by further comprising a connector for electrically connecting it to another body part or an electrical component of the transportation vehicle.

13. A body part as claimed in claim 10 characterised by having a drag coefficient in the range 0.7-0.2.

* * * * *